United States Patent Office 2,777,762
Patented Jan. 15, 1957

2,777,762
METHOD AND COMPOSITION FOR THE CONTROL OF UNDESIRABLE VEGETATION

Burton V. Toornman, Midland, Mich., assignor to The Dow Chemical Company, Midland, Mich., a corporation of Delaware No Drawing. Application November 16, 1953, Serial No. 392,500

8 Claims. (Cl. 71—2.3)

This invention is concerned with the suppression of the growth of undesirable vegetation and is particularly directed to a composition and method for the suppression of the growth of germinant seeds and emerging seedlings.

In recent years the use of chemical materials for the control of the growth of vegetation has found widespread acceptance amongst agriculturists. However, the practice of such chemical control has brought into focus short-comings in commonly employed procedures. Thus, the herbicide chemicals currently used are sometimes as toxic to established plants as they are to seeds. Also, it has generally not been possible to obtain a selective control of germinant seeds in stands of well-established plant crops, that is, crops past the seedling stage of growth. Further, the selective control of weeds in established crop plants is oftentimes carried out at a time when the weeds have already depleted the soil of moisture and nutrient. In addition, many of the toxicants have the property of being injurious to the established plant crops when sprayed or dusted upon the foliage at dosages which will kill germinant seeds.

It is an object of the present invention to provide a new method for the suppression and control of the growth of undesirable vegetation. A further object is to provide a method for the suppression of the growth of undesirable seeds and emerging seedlings in soil or other growth media which is supporting the growth of established plants or planted with large seeded crop plants. Another object is the provision of a novel composition adapted to be employed for the accomplishment of the new method of growth control. Other objects will become apparent from the following specification and claims.

According to the present invention it has been discovered that the growth of germinant seeds and emerging seedlings may be suppressed by exposing the germinant seeds and emerging seedling rootlets to the action of 2,6-dichloroanisole. This compound is a non-flammable viscous liquid having a boiling point of 105°–106° C. at 25 millimeters pressure and a melting point of 10.5° C. The compound is somewhat soluble in many organic solvents and of low solubility in water. It appears to have a high toxicity against germinant seeds and emerging seedlings, particularly those of many small seeded species of broadleaf weeds and grasses. Thus, it may be employed for the selective control of the germinant seeds and emerging seedlings of small seeded weed species in growth media planted with large seeded crop plants. It is also adapted to be employed for the control of the germinant seeds of grasses and broadleafed weeds in growth media supporting the growth of established plants. Further, it has not been found particularly injurious to established plants when applied to their foliage at dosages which will control the growth of many seeds.

The introduction of 2,6-dichloranisole into soil or growth media gives rise to varying degrees of response in germinant seeds, emerging seedlings and growing plants, depending upon the nature of the seed or plant and the dosage dispersed in the growth media, as well as the weather conditions of temperature and moisture. When large dosages are dispersed in growth media, a temporary inhibition of the growth of seeds, seedlings and established plants is obtained. This approaches a sterilizing action. The weathering action of sun and rain, and possibly the decomposition of the toxic compound by the action of bacteria and other soil organisms frees the growth media of the toxicant in a relatively short period of time. The more dilute dosages the anisole compound suppresses the growth of seeds and emerging seedlings while having little or no effect upon established plants. In relatively dilute dosages the anisole compound controls the growth of many small seeded weed species while permitting the growth of the germinant seeds and emerging seedlings of large seeded crop plants. Thus, it is possible to effect a selective treatment of mixed seedings of small seeded weeds and large seeded crop plants.

The distribution of a growth inhibiting amount of 2,6-dichloroanisole in soil is essential for the practice of the present invention. In non-selective applications to growth media, good results are obtained when a dosage of toxicant is supplied in the amount of from about 2 to 200 parts or more by weight per million parts by weight of the medium. In applications to soil, good results are obtained when the anisole compound is distributed at a rate of from about 0.2 to 200 pounds or more per acre and through such a cross-section of the soil as to provide for the presence therein of an effective concentration of the treating agent. In such applications, it is desirable that the compound be distributed to a depth of at least 0.25 inch and preferably at a dosage of at least 0.48 pound per acre inch. In selective applications, for the control of germinant seeds and emerging seedlings of broadleaf weeds and grasses in established crops or plants, a dosage of from 2 to 96 parts by weight of toxicant per million parts by weight of growth media is desirable. In selective applications for the control of the germinant seeds and emerging seedlings of small seeded weed species in areas planted with the seeds of large seeded crop plants, a dosage of from 2 to 24 parts by weight of toxicant per million parts by weight of soil is desired. In such applications, the exact dosage to be employed is dependent upon the resistance of the seeds of the large seeded crop plant to the anisole compound.

The method of the present invention may be carrried out by applying to and mixing with growth media the unmodified 2,6-dichloroanisole. However, the present method also embraces the employment of a liquid or dust composition containing the toxicant. In such usage, the anisole compound may be modified with one or a plurality of additaments including water or other liquid carriers, surface active dispersing agents and finely divided inert solids. Depending upon the concentration of toxicant, such augmented compositions are adapted to be distributed in the soil, or employed as concentrates and subsequently diluted with additional inert carrier to produce the ultimate treating compositions. The required amount of the anisole compound in the growth media conveniently may be supplied per acre treated in from 40 to 27,000 gallons or more of the liquid carrier or in from about 50 to 2000 pounds of the inert solid carrier.

The exact concentration of the anisole compound to be employed in compositions for the treatment of growth media may vary provided the required dosage of effective agent is supplied. The concentration of toxicant in liquid compositions employed to supply the desired dosage generally is from about 0.01 to 50 or even up to 90 percent by weight. In dusts, the concentration of toxicant may be from about 1 to 20 percent by weight. In compositions to be employed as concentrates, the toxicant may be present in a concentration of from about 5 to 95 percent by weight.

Liquid compositions containing the desired amount of anisole compound may be prepared by dissolving the toxicant in an organic liquid such as acetone or xylene, or by dispersing the toxicant in water with the aid of a suitable surface active dispersing agent such as an ionic or non-ionic emulsifying agent. The aqueous compositions may contain one or more water immiscible solvents for the anisole compound. In such compositions, the carrier comprises an aqueous emulsion, i. e. a mixture of water-immiscible solvent, emulsifying agent and water. The choice of dispersing and emulsifying agent and the amount thereof employed is dictated by the nature of the composition type and by the ability of the agent to facilitate the dispersion of the anisole compound in the aqueous carrier to produce the desired composition. Dispersing and emulsifying agents which may be employed in the compositions include the condensation products of alkylene oxides with phenols and organic acids, alkyl aryl sulfonates, polyoxyethylene derivatives of sorbitan esters, complex ether alcohols, mahogany soaps and the like.

In the preparation of dust compositions, the 2,6-dichloroanisole is dispersed in and on a finely divided inert solid such as talc, chalk, gypsum and the like. In such operations, the finely divided carrier is mixed or wet with the anisole compound or a volatile organic solvent solution thereof. Similarly dust compositions containing the anisole compound may be prepared from various of the solid surface active dispersing agents, such as bentonite, fuller's earth, attapulgite and other clays. Depending upon the proportions of ingredients, these dust compositions may be employed as concentrates and subsequently diluted with additional solid surface active dispersing agent or with talc, chalk or gypsum and the like to obtain the desired amount of active ingredient in a composition adapted to be applied for the control of the growth of vegetation. Also such concentrate dust compositions may be dispersed in water with or without the aid of a dispersing agent, to form spray mixtures.

When operating in accordance with the present invention, growth inhibiting amounts of the anisole compound or a composition containing the toxicant are dispersed in any convenient fashion in soil or other growth media, i. e. by simple mixing with the growth media, by applying to the surface of soil and thereafter dragging or discing into the soil to the desired depth, or by employing a liquid carrier to accomplish the penetration and impregnation. The application of the spray and dust compositions may be carried out by conventional methods, e. g. with power dusters, boom and hand sprayers and spray dusters.

In a further method, the distribution may be accomplished by introducing the toxicant in the water employed to irrigate the soil. In such procedure, the amount of water may be varied in accordance with the porosity and water holding capacity of the soil in order to obtain the desired depth of distribution of the toxicant. Following the distribution of the anisole compound, crop seed species susceptible to the concentration present in the soil should not be planted for a period of several days. By following such practice no adverse effect upon germination and growth of the crop plant is observed.

The following examples illustrate the invention and are not to be construed as limiting.

*Example 1*

Twenty-five parts by weight of 2,6-dichloroanisole, 65 parts of xylene and 10 parts of an alkylated aryl polyether alcohol (Triton X-100) are mechanically mixed together to prepare a liquid emulsifiable concentrate composition.

In a similar manner, 90 parts by weight of 2,6-dichloroanisole and 10 parts by weight of a sorbitan monolaurate polyoxyethylene derivative (Tween 20) are mixed together to prepare a concentrate composition in the form of a water dispersible liquid.

Also, 25 parts by weight of 2,6-dichloroanisole, 62 parts of fuller's earth, 10 parts of diatomaceous earth, 2 parts of an alkyl aryl sulfonate (Nacconal NR) and 1 part of a polymerized sodium salt of substituted benzoid alkyl sulfonic acids (Daxad No. 27) are mechanically mixed and ground together to prepare a concentrate composition in the form of a wettable powder.

These concentrate compositions may be dispersed in water to prepare aqueous compositions which have very desirable wetting and penetrating properties. The latter aqueous compositions are adapted to be employed to treat soil and distribute 2,6-dichloroanisole therein in growth inhibiting concentrations.

*Example 2*

The emulsifiable concentrate composition of Example 1 was dispersed in water to prepare aqueous compositions containing 0.0118, 0.0216, 0.0432, 0.0864, 0.172 and 0.344 pound of 2,6-dichloroanisole per 100 gallons of ultimate mixture. These aqueous compositions were employed for the treatment of soil and observations made of the control of the growth of the seeds and emerging seedlings of various small and large seeded plants. The large seeded plants included cotton and corn, and the small seeded plants included millet, radish, barley, buckwheat, wild oats and rye. In the determinations, the compositions were employed to treat soil areas which had been prepared and seeded with the named plant species. In the treating operations, the compositions were applied as a soil drench and at a rate of about 0.434 acre-inch of aqueous composition to supply substantially uniform dosages of about 1.25, 2.5, 5, 10, 20 and 40 pounds of 2,6-dichloroanisole per acre. These dosages correspond, respectively, to concentrations of about 2, 4, 8, 16, 32 and 64 parts by weight of 2,6-dichloroanisole per million parts by weight of soil. Other areas similarly seeded with the plant species were left untreated to serve as checks.

After about 4 weeks, the areas were examined to ascertain what control of the growth of seeds and emerging seedlings has been obtained. The results are set forth in the following table:

| Seed Species | Percent Control of Growth of Seeds and Emerging Seedlings at the Various Indicated Concentrations of Toxicant in the Treated Seed Beds | | | | | |
| --- | --- | --- | --- | --- | --- | --- |
| | 2 p.p.m. | 4 p.p.m. | 8 p.p.m. | 16 p.p.m. | 32 p.p.m. | 64 p.p.m. |
| Cotton | 0 | 0 | 5 | 30 | 40 | 50 |
| Corn | 0 | 0 | 0 | 10 | 25 | 85 |
| Radish | 0 | 0 | 25 | 98 | 90 | 99 |
| Millet | 30 | 40 | 50 | 90 | 90 | 98 |
| Barley | 80 | 80 | 85 | 95 | 100 | 100 |
| Buckwheat | 0 | 0 | 40 | 100 | 100 | 100 |
| Wild Oats | 40 | 70 | 100 | 100 | 100 | 100 |
| Rye | 95 | 100 | 100 | 100 | 100 | 100 |

At the time of observation the check areas were found to support luxuriant and vigorously growing stands of the named plant species.

*Example 3*

The emulsifiable concentrate composition of Example 1 was dispersed in water to prepare aqueous compositions containing 0.04, 0.06, 0.08, 0.10, 0.12 and 0.14 pound of 2,6-dichloroanisole per 100 gallons of ultimate mixture. These compositions were employed for the control of the growth of the seeds and emerging seedlings of small seeded weed species as represented by lamb's quarters, crabgrass, witchgrass, foxtail, pigweed and wild oats. In such operations, the compositions were employed to treat soil areas which had been prepared and seeded with the named plant species. In the treating operations, the compositions were applied to the areas as a soil drench and at a rate of about 0.5 acre-inch of aqueous composition to supply substantially uniform dosages of about 5, 7.5, 10, 12.5, 15 and 17.5 pounds of 2,6-dichloroanisole per acre. These dosages correspond respectively to concentrations of about 8.2, 12.3, 16.4, 20.5, 24.6 and 28.7 parts by weight of 2,6-dichloroanisole per million parts by weight of soil. Other areas similarly prepared and seeded with the named plant species were left untreated to serve as checks.

After four weeks, the areas were examined to ascertain what control of the growth of seeds and emerging seedlings had been obtained. The results are set forth in the following table:

| Seed Species | Percent Control of Growth of Seeds and Emerging Seedlings at the Various Concentrations of Toxicant in the Treated Areas | | | | | |
|---|---|---|---|---|---|---|
| | 8.2 p. p. m. | 12.3 p. p. m. | 16.4 p. p. m. | 20.5 p. p. m. | 24.6 p. p. m. | 28.7 p. p. m. |
| Lamb's Quarters | 99 | 100 | 100 | 100 | 100 | 100 |
| Crabgrass | 34 | 64 | 89 | 90 | 94 | 96 |
| Witchgrass | 98 | 100 | 100 | 100 | 100 | 100 |
| Foxtail | 89 | 96 | 97 | 100 | 99 | 100 |
| Pigweed | 83 | 88 | 86 | 95 | 97 | 99 |
| Wild Oats | 96 | 99 | 99 | 100 | 100 | 100 |

Substantially complete germination of all seeds was found in the check areas.

*Example 4*

The emulsifiable concentrate composition of Example 1 was dispersed in water to prepare an aqueous spray composition containing about 10 pounds of 2,6-dichloroanisole per 40 gallons of ultimate mixture. This composition was applied to the foliage of plots of wheat and wild oats which were about eight inches in height. The treatment was carried out with conventional spraying equipment and at a dosage of 40 gallons per acre. Observations were carried out to determine the presence of growth response in the treated plants, and no such response, attributable to the anisole compound, was found.

*Example 5*

In a further determination the emulsifiable concentrate composition of Example 1 was dispersed in water to prepare an aqueous composition containing about 0.42 pound of 2,6-dichloroanisole per 100 gallons of the ultimate mixture. This composition was applied to a soil area which had been prepared and seeded with timothy. In such operations, the composition was applied as a soil drench and at a rate of about 0.164 acre-inch of aqueous composition to supply a substantially uniform dosage of about 20 pounds per acre. This dosage corresponds to a concentration of about 95 parts of 2,6-dichloroanisole per million parts by weight of soil. Another area similarly prepared and seeded was left untreated to serve as a check.

After about four weeks, the treated area was examined and a 100 percent control of germination and emergence of timothy observed. At the time of observation, the check area was found to support a vigorously growing stand of timothy.

*Example 6*

Sandy loam soil of good nutrient content was spread in flats to a depth of about three inches and the flats thereafter treated with aqueous compositions containing 0.42 pound and 0.21 pound of 2,6-dichloroanisole per 100 gallons of ultimate mixture. The employed compositions were prepared from the emulsifiable concentrate composition of Example 1. In the treating operations, the compositions were applied to the soil in the several flats as a soil drench and at a rate of about 0.164 acre-inch of aqueous composition to supply substantially uniform dosages of about 10 and 20 pounds of 2,6-dichloroanisole per acre. These dosages correspond, respectively, to concentrations of 47 and 95 parts by weight of 2,6-dichloroanisole per million parts by weight of soil. The treated flats and untreated check flats were then subjected to conventional greenhouse practices with regard to temperature, moisture, humidity and light.

One day following the applications, certain areas in the treated flats were seeded with corn, wild oats and buckwheat while other areas were similarly seeded at intervals of two, three and four days up to 10 days. Untreated check flats were similarly seeded with the named plant species. The flats were then observed to ascertain what effect the delayed planting had upon the germination, emergence and subsequent growth of the emerged seedlings. Substantially complete germination and emergence and subsequent normal development was observed for the corn which was seeded 4 days following the treatments and at both dosages of 2,6-dichloroanisole. Normal emergence and development was observed for wild oats which were seeded 6 days after the treatments and at both dosages of toxicant. With buckwheat normal emergence and growth was observed for those flats which were planted 10 days following the applications and at both toxicant dosages.

The expression "growth media" is employed in the present specification and claims in its broadest sense to be inclusive of all conventional "soils," as defined in Webster's New International Dictionary, second edition, unabridged, published in 1937 by G. and C. Merriam Company, Springfield, Massachusetts. Thus, the term refers to any substance or media in which vegetation may take root and grow, and is intended to include not only earth but compost, manure, muck, humus, and sand and the like, adapted to support plant growth.

The expression "surface active dispersing agent" as herein employed is intended to include all agents which are capable of acting at the interfacial surface between the 2,6-dichloroanisole and water as the dispersion medium, so as to facilitate the dispersion of the anisole compound in water. Thus, the term is inclusive of the solid emulsifying agents such as finely divided aluminum hydroxide and finely divided bentonite, fuller's earth, attapulgite and other clays, as well as the ionic and non-ionic wetting and emulsifying agents such as the alkaline earth metal caseinates, alkyl aryl sulfonates, sulfonated oils, complex organic ester derivatives, complex ether alcohols, and the like.

The term "finely divided inert solid" as herein employed refers to materials which are incapable of facilitating the dispersion of the water-immiscible 2,6-dichloroanisole in water as the dispersion medium and is intended to include finely divided materials such as chalk, talc, gypsum and the like.

I claim:

1. A method which comprises the step of contacting seeds and emerging seedling rootlets, while positioned in a growth medium, with a growth inhibiting amount of 2,6-dichloroanisole.

2. A method which comprises impregnating soil with a growth inhibiting amount of 2,6-dichloroanisole.

3. A method as claimed in claim 2 wherein the 2,6-dichloroanisole is present in the amount of at least 2 parts by weight per million parts by weight of the soil.

4. An agronomical practice which comprises distributing 2,6-dichloroanisole in soil to a depth of at least 0.25 inch below the soil surface and at a substantially uniform dosage of at least 0.48 pound per acre-inch of soil.

5. A method for the selective control of the germinant seeds and emerging seedlings of small seeded weed species in soil planted with large seeded crop plants, which comprises distributing 2,6-dichloroanisole in such soil in the amount of from 2 to 24 parts by weight per million parts by weight of the soil.

6. A concentrate composition which comprises as an active toxic ingredient 2,6-dichloroanisole in admixture with at least one material selected from the group consisting of finely divided inert solids and surface active dispersing agents.

7. A concentrate composition as claimed in claim 6, where the active ingredient is admixed with a surface active dispersing agent.

8. A composition for the suppression of the growth of vegetation which comprises an aqueous dispersion of the composition claimed in claim 7.

References Cited in the file of this patent

Norman: "Studies on Plant . . ." and Thompson et al.: "New Growth-Regulating . . .," published June 1946 in Botanical Gazette, vol. 107, pages 475 through 484 and pages 496 and 499.

Chemical Abstracts, vol. 12, published 1918, pages 1542 and 1543, article "The preparation of six dichlorophenols . . ."

Chemical Abstracts, vol. 26, published 1932, page 2728, article "Halogen derivatives . . ."

Chemical Abstracts, vol. 47, column 5497, published June 10, 1953, article "The growth-regulating effects . . ."